Feb. 21, 1950         R. D. McDILL         2,498,565
              MOTOR POSITION CONTROL MEANS
                  Filed Dec. 30, 1944

INVENTOR.
Rex D. McDill
BY
Hawgood and Van Horn
   ATTORNEYS

Patented Feb. 21, 1950

2,498,565

UNITED STATES PATENT OFFICE 2,498,565

MOTOR POSITION CONTROL MEANS

Rex D. McDill, Cleveland Heights, Ohio, assignor to James B. Shaver, University Heights, Ohio Application December 30, 1944, Serial No. 570,703

8 Claims. (Cl. 318—104)

This invention relates to measuring and controlling apparatus and is particularly applicable to such apparatus which is controlled or operated in accordance with minute changes which are electronically detected and electrically controlled.

An object of the invention is to provide an improved control apparatus which will accurately maintain adjustment.

Another object is to provide an improved control apparatus which will automatically eliminate materials which might impair its functioning.

Another object is to provide an improved control apparatus by which a plurality of parts may be simultaneously controlled to insure their jointly contributing to a desired result.

Another object is to provide an improved control apparatus which will be simple in construction and operation.

Another object is to provide an improved control apparatus which will be compact.

Another object is to provide an improved control apparatus which will conserve power.

Another object is to provide an improved control apparatus which will require a minimum of attention and service.

Another object is to provide an improved control apparatus which may be readily adjusted and adapted to different conditions.

Another object is to provide an improved control apparatus which may be constructed of simple and readily available parts.

Other objects will hereinafter appear.

The invention will be better understood from the description of one practical embodiment thereof illustrated in the accompanying drawing, in which:

Figure 1 is a diagrammatic view of various parts and circuits designed for use in an apparatus such, for instance, as shown in my copending application, Serial No. 544,562, filed July 12, 1944, now Patent No. 2,470,511; and, Figure 2 is a perspective view of the window cleaning portion of the mechanism shown diagrammatically in the first figure.

In my above mentioned application is shown a device which for convenience I call a "smoke meter," it being an apparatus to determine the amounts of solids or other opaque materials carried by gas and gaseous mixtures, such as air, and to control cleaning, ventilating, or other desired apparatus in accordance with the amount of such solid materials present, so that the air or gas may be adequately cleaned or replaced to eliminate any undesired excess of such material, while the apparatus may be shut down, conserving power, heat and the like, as long as no such excess exists.

The apparatus consists essentially of a light-tight passage through which the air or the like to be studied passes, and in which there is a source of light and a photo-sensitive cell, the two being adjusted in such manner that when the quantity of opaque material in the gas exceeds a predetermined permissible amount, this material reduces the light passing from the source to the light-responsive cell sufficiently to cause the controls actuated by the cell to function.

It has been found that while such apparatus is capable of very sensitive control, particles of soot, dust and the like carried by the column of air between the light source and the photo-sensitive cell become deposited on either or both of these elements, reducing the quantity of light which passes from one to the other, and as such film of dust or soot builds up, the accuracy of the device is impaired so that it becomes necessary to make frequent re-adjustments to compensate for the increased opacity of the deposited film.

Placing the light source and photo-sensitive cells in sealed containers with transparent windows facing each other has helped to some extent, but, of course, deposits of solid material occur on these windows.

Accordingly, I have now devised a mechanism which will wipe such windows clean at intervals, and controls for this mechanism which cause it to operate only when the device is functioning, and have incorporated the control of these devices with the control of the light source, photocell and the controlled ventilating or like apparatus, by the various combinations described herein.

The mechanical parts of these features will be later described, as this will be appreciated more readily after the description of the arrangement of the parts with which they must function.

The various circuits illustrated are as follows:

Power is supplied from any suitable source, such as an ordinary 110 volt 60 cycle alternating current generator (not shown) through conductors 1 and 2, one or both of which may be fused as indicated at 3, to the primary 4 of a transformer.

From the secondary 5 of the transformer, current passes through conductors 6 and 7 to a rectifier 8, which may be of the copper oxide type, and from which rectified current passes through conductors 9 and 10 through various parts of the apparatus.

Current from lines 1 and 2 is also conducted, by conductors 11 and 12, to the primaries 13 and 14 of two additional transformers, the former of which supplies current for the actuating of the timing portion of the device and the latter of which supplies the photo-cell portion of the apparatus.

Associated with primary 13 are three secondaries 15, 16 and 17.

The ends of secondary 15 are connected by conductors 18 and 19 to the anodes of a rectifier tube 20, current to heat the filament of this tube being supplied by secondary 16 through conductors 21 and 22.

From a central tap in secondary 15 a conductor 23 extends to a ground 24.

The ends of secondary 17 are connected by conductors 25 and 26 to the filament of a thermoionic tube 27, and a central tap on the secondary 17 is connected by conductor 28 to a ground 29.

From conductor 23, a conductor 30 extends upwardly having its remote end connected to a contact 31 of a relay, the cooperating contact 32 of which is connected by conductor 33 to a resistor 34, which in turn is connected with the grid of the valve 27. From the connection between the resistor 34 and the grid of the valve 27, a conductor 35 extends to a condenser 36, the opposite side of which is connected by a conductor 37 to a conductor 30.

Also connected to conductor 30 is a resistance 38 and a condenser 39, the resistance being connected by a conductor 40 to the anode of the valve 27.

Conductor 21 extends upwardly, terminating at a condenser 41, and a branch terminates at the coil 42 of the relay including contacts 31 and 32. The other end of this relay coil is connected by a conductor 43 to the condenser 41 and to the plate of the tube 27. The remaining side of condenser 39 is also connected to conductor 31, and a resistance 44 is interposed between this conductor and the conductor 40.

The relay operated by coil 42 also includes two contacts 45 and 46, in a more remote part of the circuit, which will be hereinafter described.

Branching from conductor 12 is a conductor 47 which leads to transformer primaries 48 and 50 joined by a conductor 49, the current returning conductor 51 to main line conductor 11.

The secondary 52 associated with primary 48 is connected to an adjustable resistance 53, such as a rheostat, while the secondary 54 associated with primary 50 is connected by conductors 55 and 56 to the filament of an illuminating bulb 57.

From conductor 10 branch conductors 58 and 58a extend to the conducting segments carried by the shafts 59 and 59a of two wiper motors 60 and 60a, which parts will be more fully described in conjunction with Figure 2, and in contact with these segments are, respectively, stationary brushes 61 and 61a which in turn are connected by conductors 62 and 62a to the windings of the motors 60 and 60a.

The other ends of the windings of the motors are connected by conductors 63 and 63a to conductor 9.

From its connection with conductors 63 and 63a, conductor 9 also extends to contact 45 of the relay including coil 42, previously described, while conductor 10 extends to contacts 64 and 65 of another relay having a coil 66, one end of which is connected to conductor 10 by conductor 67, and the other end of which is connected to a conductor 68 extending to contact 69 of a third relay.

Conductor 62 is extended to a contact 70 associated with contact 64 in the second mentioned relay, and conductor 62a is similarly extended to a contact 71 associated with contact 65 in the same relay.

A conductor 72 connects contact 45 of the first mentioned relay to a contact 73 of the third mentioned relay, the latter contact being associated with contact 69.

Associated with the primary 14 are two secondaries 74 and 75, the first of which, through conductors 76 and 77 furnishes current to the filament of a rectifying tube 78.

From conductors 76 and 77 conductors 79 and 80, respectively, extend to the filament of a thermo-ionic valve 81.

From one end of secondary 75, a conductor 82 communicates with both anodes of the rectifier tube 78, while from the other end of secondary 75 the conductor 83 extends upwardly having a branch 84 connected to a condenser 85, another branch connected to a resistor 86, and a third branch ending at an adjustable resistance or potentiometer 87.

From the adjustable contact of potentiometer 87, a conductor 88 connects to a resistance 89, which is in turn connected by conductor 90 with the grid of valve 81.

The conductor 90 is also connected through a conductor 91 to one element of a photo-sensitive cell 92, the other element of the cell being connected by a conductor 93 to the plate of the valve 81, this conductor 93 being connected by a conductor 94 to the coil 95 of the third mentioned relay and also to a condenser 96 in parallel therewith.

From the remote end of the coil 95 and the opposite end of condenser 96, a conductor 97 extends to cathode of rectifier 78.

From the anode of tube 81, a conductor 98 extends to a ground 99, being connected to the ends of potentiometer 87 and of resistance 86.

Shunted across, between conductors 97 and 98, is a condenser 100. Also shunted across these conductors, and in parallel with this condenser, are two voltage regulators 101 and 102 connected in series.

In Figure 2, the wiper motor is shown as having a shaft 103 carrying an arm 104 provided at its outer end with a brush 105 arranged to sweep across a window or lens 106.

The shaft also carries the conducting segment 59 in position to be engaged by brush 61, this segment having inserts 159 of insulating material at both ends upon which the brush rides at the ends of the strokes or oscillations of the shaft.

It will be understood that one of the windows 106 or lenses is positioned adjacent the light 57 and another adjacent the photocell 92, and that the function of these windows is to exclude dust, dirt, and the like, from reaching the photo-cell.

The brushes may be swept back and forth across the windows to remove dirt and dust therefrom as this lodges, and each is prevented from stopping in front of its window by the fact that its brush 61 is in contact with the segment 59, and so operates to complete the circuit through the motor 60, keeping the shaft turning until the brush runs off the conducting part of the segment onto the non-conducting portion 159 at one end or the other, thus insuring the stopping of the motor only in positions at the ends of its stroke where the brush is removed from the window.

The third relay also includes two contacts 107 and 108, connected to conductors 109 and 110, respectively, which may be included in the circuit of any device which it is desired shall be actuated in accordance with the light received by photo-cell 92, such as, a ventilator, blower, air cleaning device or the like.

The operation of the device is as follows:

With the parts positioned so that the atmosphere or other fluid which is to control the apparatus may pass between the source of light 57 and the photo-sensitive cell 92, and a blower, cleaner, or other device to be actuated connected to lines 109 and 110, power is supplied to main line conductors 1 and 2, this power passing through primaries 4, 13, 14, 48 and 50 of the various transformers.

This induces current in the respective secondaries 5, 15, 16, 17, 52, 54, 74 and 75, these induced currents, of course, being of suitable voltage to actuate the various parts associated with them.

The current passing through primaries 48 and 50 may be controlled by adjustment of the variable resistance 53 to produce a substantially constant flow of current through secondary 54 and thus through the filament of the light source 57.

The current passing through secondary 75 is rectified by rectifier tube 78, the filament of which, as also the filament of valve 81, is heated by current from secondary 74.

The current from secondary 75 divides, some of it passing through voltage controllers 101 and 102 interposed between the plate and cathode of valve 81, and so supplies the plate current for this valve which is also the current for energizing coil 95 of the third relay.

Part of this current also passes to the grid of valve 81 through the resistors 87 and 89, imposing an operating bias on this grid, which in turn is supplemented by the current from photo-sensitive cell 92, so that this cell controls the passage of current between the plate and cathode, being sufficient to block flow of such current as long as light of over a predetermined intensity reaches the photo-cell.

The quantity of this light is readily predetermined by the choice of the various resistances and by the adjustment of the variable resistance of potentiometer 87.

Thus, it is possible to insure the functioning of the relay operated by coil 95 at any time when insufficient light reaches photo-cell 92.

When coil 95 is energized, contacts 107 and 108 are brought together, supplying current to the blower, cleaner, or other apparatus connected to conductors 109 and 110, which apparatus functions so long as the coil is energized, which, in turn, is until the opacity of the fluid between the light source and photo-cell is reduced to a desired quantity.

During the same period contacts 69 and 73 of the third relay remain closed.

Current from secondary 16 serves merely to heat the filament of rectifier 20. Current from secondary 17 serves merely to heat the filament of valve 27.

Current from secondary 15, after being rectified by rectifier 20, passes through conductors 21, 23, and 30, resistance 38, and conductor 40 to the plate and cathode of tube 27, as well as passing through the coil 42 of the first described relay.

This plate current of valve 27 is controlled by grid bias supplied through conductor 35, which charges condenser 36, blocking the plate current until the voltage which is applied to the grid causes the condenser to discharge, permitting the plate current to energize the coil 42.

This energization closes contacts 31 and 32, permitting the grid current to flow through resistor 34 and conductors 33 and 30 around the condenser 36, so that once again a bias is imposed on the grid which prevents the flow of plate current, de-energizing the coil 42 and permitting the contacts to open.

Simultaneously with the closing of the contacts 31 and 32, contacts 45 and 46 are also closed, and, like the first mentioned contacts, are permitted to re-open on de-energization of the coil.

The time required to build up the necessary charge on condenser 36 causes a periodic opening and closing of the circuit between conductors 9 and 72, so that this circuit is only intermittently completed, namely: at the times when coil 42 is energized and when coil 95 also is energized.

The circuit of conductors 9 and 10 controls the operation of the wiper mechanism, as it will be noted that current passing from rectifier 8 through conductors 9 and 10 travels through contacts 45 and 46 to conductor 72, thence through contacts 73 and 69 to conductor 68, which carries it through relay coil 66 to conductor 10 and also to contacts 64 and 65. These contacts, when coil 66 is energized, are drawn into contact with contacts 70 and 71, permitting current to flow to conductors 62 and 62a and thence to the wiper motors 60 and 60a, from which the current may return by conductors 63 and 63a, respectively, to line 9.

Consequently, whenever coils 42 and 95 are energized simultaneously, each of the motors 60 and 60a is put into operation and will remain in operation so long as both these relay coils are energized.

When, however, either coil 42 or 95 is de-energized, the circuit is broken, coil 66 becomes de-energized and the two sets of contacts associated with it open so that current no longer may pass through these contacts to the motors.

Inasmuch as breaking of the circuit in the above manner may occur at any time, not dependent on the position of the brushes 105, these might be stopped in front of their lenses 106, if it were not for the circuits through the sectors 68 which have been provided.

It will be understood that whenever the brush is in front of its lens, conducting segment 59 is in contact with brush 61 (or 59a is in contact with 61a, as the case may be) and so long as this condition exists, current may flow through conductor 10, segment 59, brush 61 to conductor 62 and thence to the motor 60, the current returning from the motor through conductors 63 and 9.

Hence, if one of the relays breaks the circuit while a brush is in front of its lens 106, its motor does not stop until that brush has been swept past the window, so that contact 61 is brought onto an insulating segment 159, discontinuing the supply of current to the motor 60.

While I have described the illustrated embodiment of my invention in some particularity, obviously many other embodiments, variations, and modifications will readily occur to those skilled in this art, and I do not, therefore, limit myself to the precise details shown and described herein, but claim as my invention all embodiments, modifications and variations coming within the scope of the appended claims.

I claim:

1. In combination with a movable member, electrically actuated driving means therefor, a source of electrical energy, and parallel circuits between said source and said driving means, one of said circuits including automatic timing means maintaining the circuit closed for a predetermined time, and the other said circuits including commutator means associated with said movable member holding the circuit closed when the object is in a predetermined position.

2. Object moving means comprising a movable object, an electrically actuated driving means associated with the object, a source of electrical energy, a circuit between said source and said driving means including a stationary contact and a movable contact movable with said object and in engagement with said stationary contact, a second circuit between said source and said driving means including periodically automatically operating circuit making and breaking means.

3. Object moving means comprising a movable object, an electrically actuated driving means associated with the object, a source of electrical energy, a circuit between said source and said driving means including a stationary contact and a movable contact movable with said object and in engagement with said stationary contact, a second circuit between said source and said driving means including periodically automatically operating circuit making and breaking means, and including circuit making and breaking means actuated in accordance with the supply of current to a controlled electrical device.

4. Object moving means including two independently movable objects, driving means connected in driving relation to the first object, driving means connected in driving relation to the second object, a source of electrical energy, a circuit connecting said source to each of said driving means and including chronometric circuit making and breaking means, independent circuits in parallel with a portion of said first mentioned circuit, one associated with the first driving means and one associated with the second mentioned driving means, each of said last mentioned circuits including circuit making and breaking means actuated in accordance with the movement of its associated object.

5. In combination an electric motor, a circuit supplying power to said motor, two automatic circuit making and breaking means connected in parallel in said circuit, one of said circuit making and breaking means being connected to and operated by said motor to break the circuit only at a predetermined part of the cycle of the motor, and the other circuit making and breaking means being controlled independently of the operation of the motor.

6. In combination an electric motor, a circuit supplying power to said motor, two automatic circuit making and breaking means connected in parallel in said circuit, one of said circuit making and breaking means being connected to and operated by said motor to break the circuit only at a predetermined part of the cycle of the motor, and a relay controlling said second mentioned circuit making and breaking means.

7. In combination an electric motor, a circuit supplying power to said motor, two automatic circuit making and breaking means connected in parallel in said circuit, one of said circuit making and breaking means being connected to and operated by said motor to break the circuit only at a predetermined part of the cycle of the motor, and the other circuit making and breaking means being controlled independently of the operation of the motor, a light-sensitive element, a source of illumination, a relay controlled by said light-sensitive element and controlling said first mentioned circuit making and breaking means, a light pervious element between the light-sensitive element and the source of illumination, and cleaning means for said light pervious element actuated by said motor.

8. In combination a plurality of motors, a source of electrical power, circuits including said source of power and said motors, one portion of said circuits being common to all the motors and another portion of said circuit for each motor being independent of the other, two circuit making and breaking means in parallel in the second mentioned portion of the circuit of each motor, common means controlling one circuit making and breaking means of each motor's circuit, and the other circuit making and breaking means being connected to and operated by the motor to break the circuits only at predetermined parts of the cycles of said motors.

REX D. McDILL.

REFERENCES CITED

The following references are of record in the file of this patent:

UNITED STATES PATENTS

| Number | Name | Date |
|---|---|---|
| 1,929,273 | Crago | Oct. 3, 1933 |
| 2,264,013 | Webb | Nov. 25, 1941 |
| 2,272,754 | Stratton | Feb. 10, 1942 |
| 2,300,838 | Dicke | Nov. 3, 1942 |
| 2,305,407 | Crago | Dec. 15, 1942 |
| 2,323,081 | Baird | June 29, 1943 |
| 2,364,603 | Coxon et al. | Dec. 12, 1944 |

FOREIGN PATENTS

| Number | Country | Date |
|---|---|---|
| 828,994 | France | June 7, 1938 |